Oct. 4, 1966  S. FISHER  3,276,812
ANTI-VIBRATION CAB MOUNTING
Filed May 4, 1964  6 Sheets-Sheet 1

Inventor
Stanley Fisher
BY
E.W. Christen
Attorney

Oct. 4, 1966  S. FISHER  3,276,812
ANTI-VIBRATION CAB MOUNTING
Filed May 4, 1964  6 Sheets-Sheet 6

Inventor
Stanley Fisher
BY
C. W. Christen
Attorney

United States Patent Office 3,276,812
Patented Oct. 4, 1966

3,276,812
ANTI-VIBRATION CAB MOUNTING
Stanley Fisher, Caddington, near Luton, England, assignor to General Motors Corporation, Detroit, Mich., a corporation of Delaware
Filed May 4, 1964, Ser. No. 364,418
Claims priority, application Great Britain, May 23, 1963, 20,598/63
7 Claims. (Cl. 296—35)

This invention relates to the resilient support of the drivers' cabs of road vehicles.

It has been found that, within a certain limited range of road speeds, a driver's cab is likely to undergo a vibration which rocks the cab in the fore-and-aft direction about its rear mounting support, causing discomfort to the occupants by reason of the jerking imparted to their cervical and abdominal region. This uncomfortable motion, which may be succinctly termed "cab nod," occurs in a middle speed range, say between 25 and 45 m.p.h. It occurs despite resilient mounting of the cab on the chassis, and is apt to become more noticeable in prolonged driving on straight, flat roads with a good surface.

The present invention results from the discovery that this motion is caused by the vibration of the vehicle chassis as a free beam, caused by periodic forces imparted to it during travel by minor irregularities in the road-wheel and tyre shape and in the road surface. The amplitude of vibration reaches a maximum in the resonant condition prevailing at the natural frequency of vibration of the chassis.

The basis of the invention is in so adapting the resilient cab mountings to this kind of vibration that the cab is effectively isolated from the effects of it.

The invention comprises a road vehicle driver's cab resiliently supported at front and rear on a chassis, with the rear resilient support at or near a node of the mode of vibration of the chassis when the vehicle is travelling, and with the front resilient support sufficiently soft, within the range of its deflection corresponding to the amplitude of such vibration, to substantially isolate the cab from the vibration.

The rear support of the cab may include two resilient mountings located at or near to a node of the mode of vibration of the chassis when the vehicle is travelling; and the front support may include either one or two resilient mountings which either singly or jointly have the properties required for the front support. The front resilient mounting may include flat leaf springs buckled into the shape of a sine curve. Each of the rear mountings may be a cylindrical one comprising a rubber sleeve between an inner and an outer metal cylinder, the mountings having their cylinder axes approximately vertical but converging sufficiently to permit the frame to twist relative to the cab by stressing the rubber sleeves in sheer.

The scope of the invention is defined by the appended claims; an example according to the present invention of how "cab nod" can be avoided, or much reduced, is particularly described below with reference to the drawings accompanying the provisional specification, in which:

FIGURE 4a is a partial view similar to FIGURE 4 showing the double front cab mounting;

Figure 1:
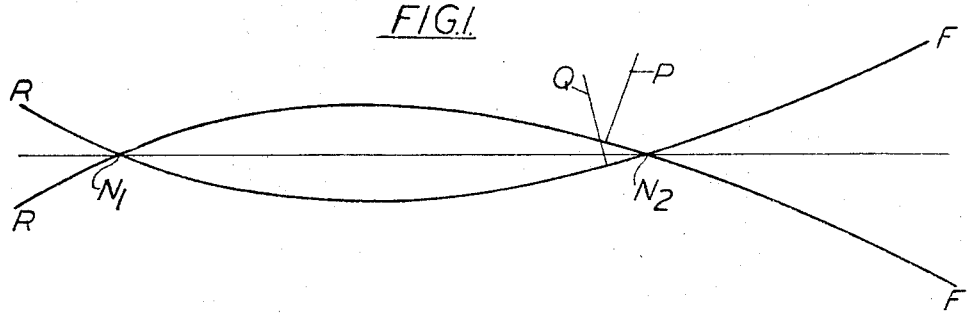
FIGURE 1 is a diagram showing, in exaggerated form, the mode of vibration of a road vehicle chassis.

Experiments have shown that a vehicle chassis frame when subjected to a periodic exciting force, vibrates like a free beam, with a mode of vibration approximately as shown in FIGURE 1, where F is the front end of the chassis and R the rear end, and $N_1$, $N_2$ the two nodes. The lines P, Q, represent, to an exaggerated scale, the positions of a vertical part of the cab, or of a person inside the cab, at the two extremes of the vibrational amplitude, resulting in the backwards and forwards rocking from P to Q which has been referred to above as "cab nod."

Figure 3:
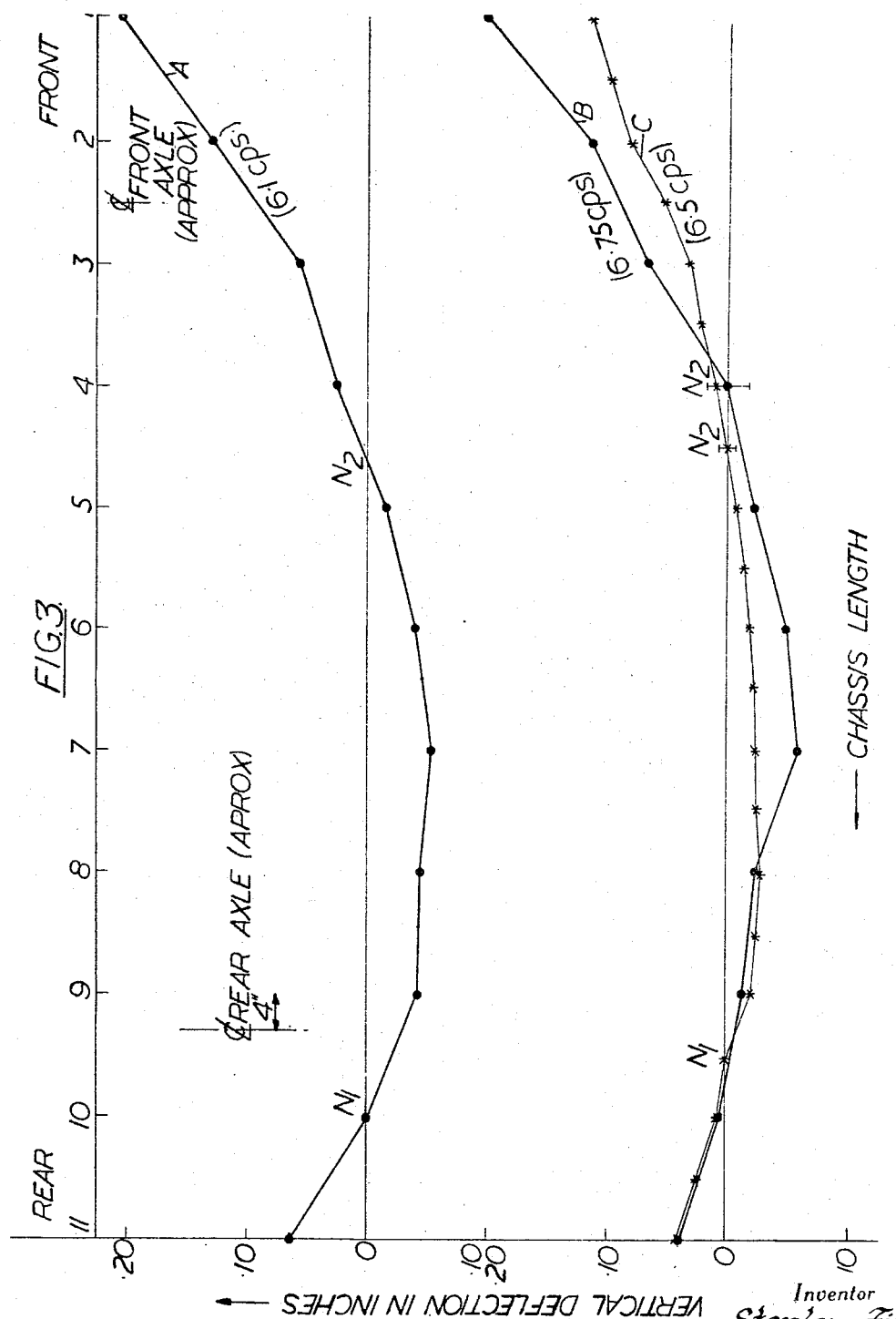
FIGURE 3 represents vibrational measurements taken for three examples of chassis.

FIGURE 3 shows the vertical vibrational deflection during "chassis frame beaming resonance," in inches (vertical scale) plotted for different points along the chassis frame (horizontal scale), for three different chassis frames A, B and C, the frequency of the vibration in cycles per second (c.p.s.) being given in each case. The nodal points $N_1$, $N_2$ are marked, and the resemblance of the curves to those of FIGURE 1 will be noted.

Figure 4:
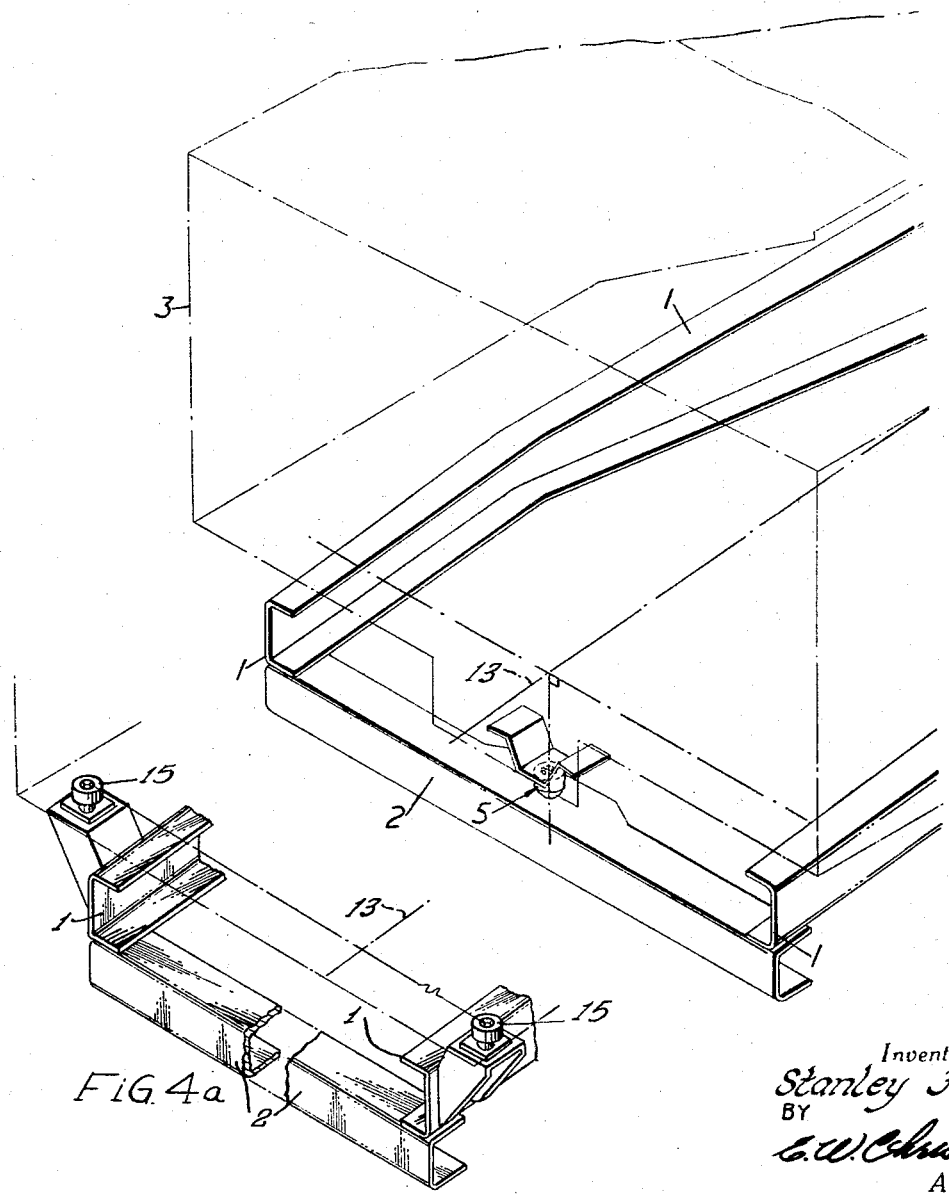
FIGURE 4 is an isometric sketch of the front end of a vehicle chassis frame, showing the single front cab mounting arrangement.
Figure 6:
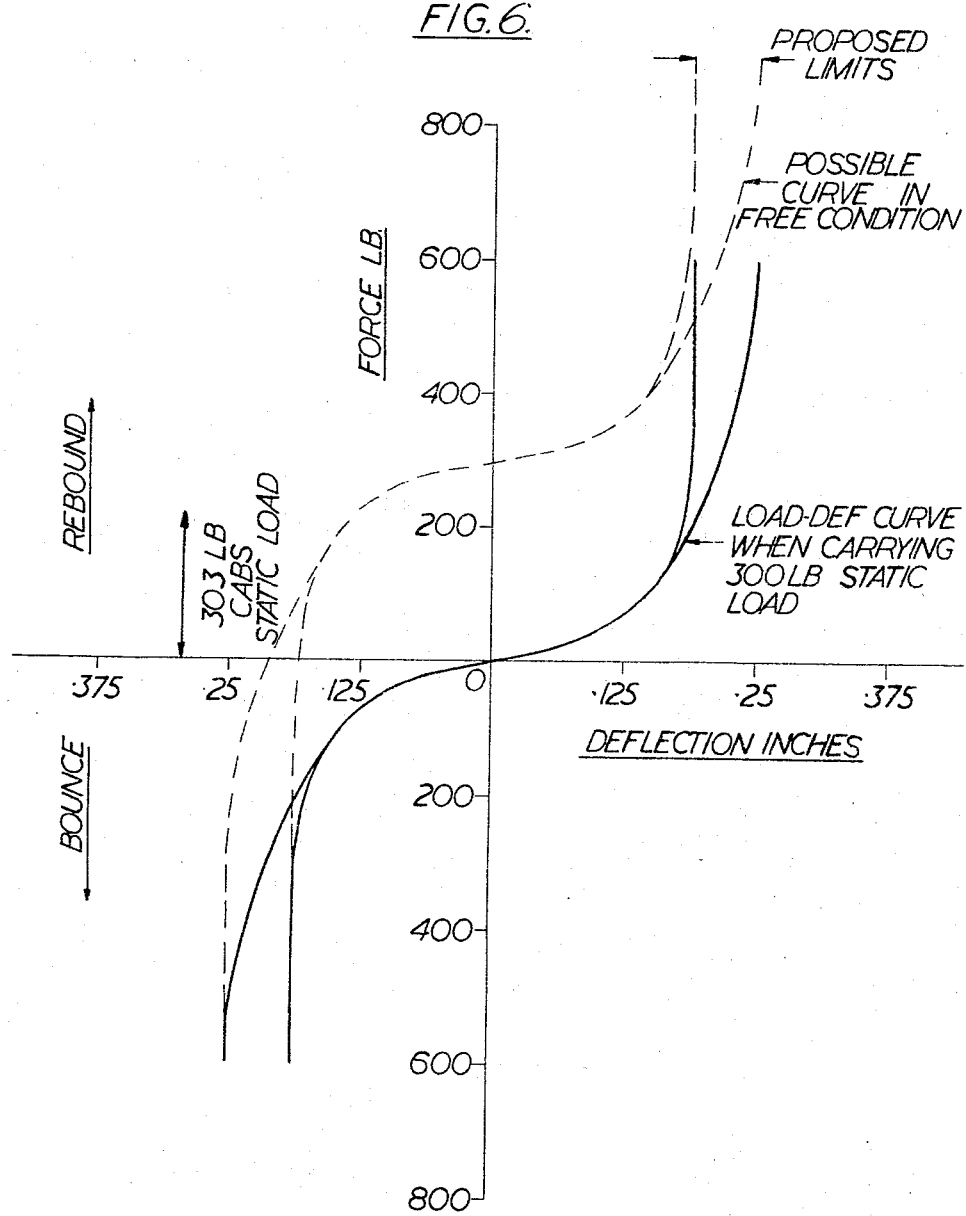
FIGURE 6 is a graph of the spring rate of a front cab mounting.

In FIGURES 4 and 4a is shown the positioning of the front and rear resilient mountings of a driver's cab, so as to avoid or minimise "cab nod" and achieve a great improvement in cab ride. The chassis includes longitudinal side members 1, joined at front by a cross member 2. The cab 3, which is indicated diagrammatically, is supported at the rear by two resilient mountings 4, and at the front by a single central resilient mounting 5. The two rear mountings 4, inclined to the chassis frame twist axis, are placed at or near the nodal point $N_2$ as determined for the particular chassis design, and are therefore practically free from the vibrational deflection and frame twist. The front mounting 5, which is still subject to the vibration, is constructed so as to absorb it and effectively to isolate the cab therefrom. For this purpose, the mounting has in the static laden condition a very low spring rate, that is it is very soft for small deflections corresponding to the amplitude of the vibrations and small road shocks at the front end, say up to a maximum of about .20 inch; but for larger deflections due to larger road shocks has a much higher spring rate (that is it is much stiffer), to give the necessary bounce and rebound control. FIGURE 6 shows a suitable load-deflection curve of such a resilient mounting, in which zero is the static laden condition. The non-linear plotting of the spring rate shows a very low rate (that is, a small increase of load for increasing deflection) over the range of deflection of about .125 in either direction, which includes most of the vibrational range experienced. The natural frequency of bounce of the resilient mounting is lower than the natural frequency of vibration of the frame, and should be above $\sqrt{2}$ times as low.

Figure 2:
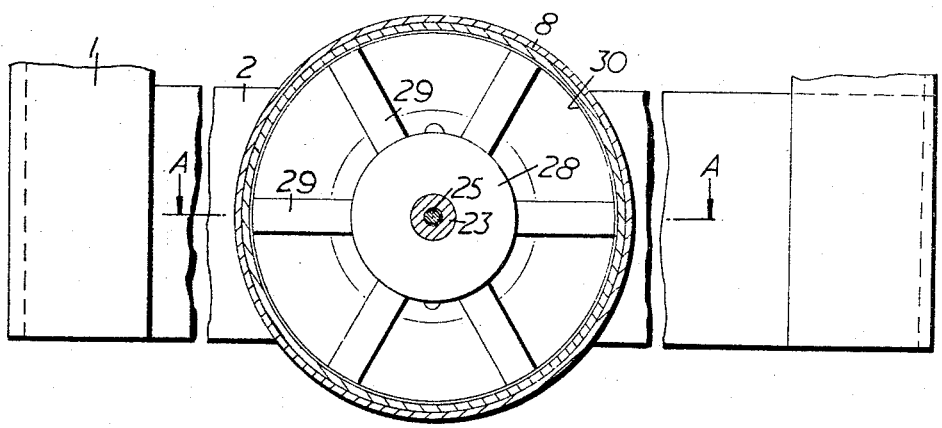
FIGURE 2 is a sectional view generally taken on the line B—B of FIGURE 7.
Figure 7:
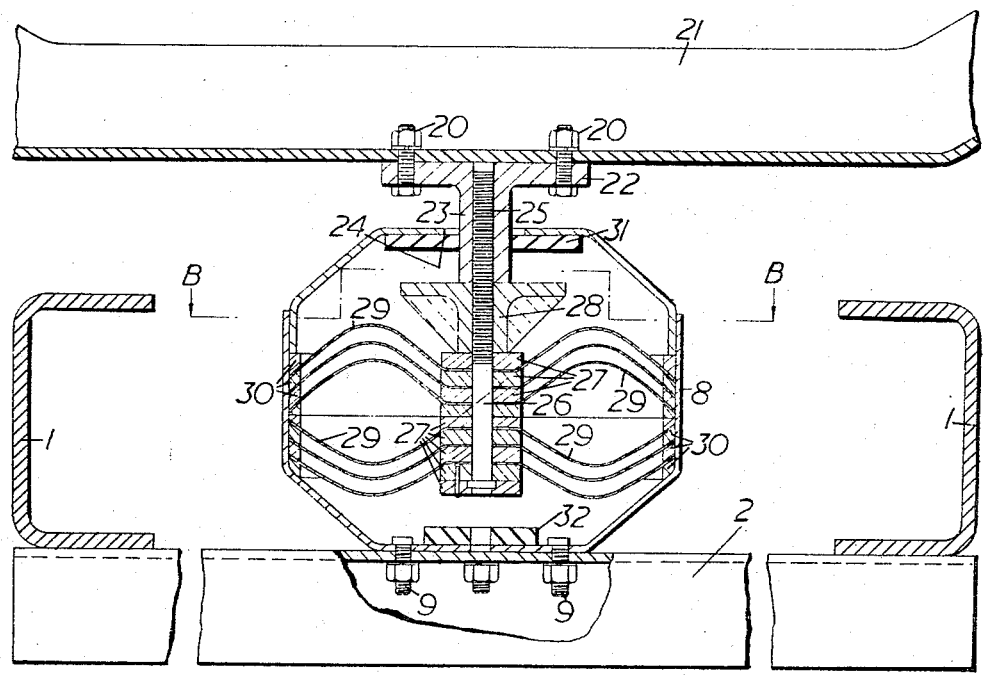
FIGURE 7 is a front elevation of a front cab mounting, sectional on the line A—A in FIGURE 2.

The front mounting 5 is shown in detail in FIGURES 2 and 7 and comprises a circular section casing shell 8 bolted to the cross member 2 by bolts 9. The cab cross-member 21 has fixed to it by bolts 20 a connecting flange 22 having a projecting sleeve 23 with an internal thread. The sleeve 23 enters the shell 8 through an aperture 24, and has screwed into it a long threaded bolt or spindle 25, the lower plain portion 26 of which passes through spacer collars 27 and is also screwed into a threaded collar 28 with a flat upper surface which acts as a limit stop.

Multi-leaf flat springs 29 are clamped at the centre to the spindle 25, 26 by means of the spacer collars 27, the outer ends of the springs being clamped between outer spacer rings 30. The springs 29 are in radiating formation (FIGURE 2), and they are held at the clamping points so as to be buckled into the form of biased sine curves in the unloaded condition, in which they produce an upward vertical thrust equal to the static front-of-cab load. In the laden condition they have a non-linear spring rate as shown in FIGURE 6, giving the desired isolation from chassis frame "beaming resonance" and small road shocks over a limited amplitude, and a progressive increase in spring rate to give the desired bounce and rebound control.

The spindle 25, 26 with the collars 27 and the sleeve 28, form a plunger which is movable in the casing shell 8 against the force of the springs 29. To fix the appropriate limits of movement top and bottom pads 31, 32 are fixed in the shell 8, and can be controlled by the stop 28 and by the bottom collar 27, respectively.

Alternatively the desired biased non-linear spring rate could be achieved by combining the linear and non-linear spring rates of coil springs and pres-stressed struts; or linear and non-linear rubber mountings; or by means of air suspension.

Each of the rear mountings 4 is cylindrical mounting comprising a coned rubber sleeve 4A held between an inner and an outer cylinder (not shown), so arranged that the cab is resiliently supported by the rubber sleeve 4A. The respective parts of the rear mountings are fixed to the chassis side member 1 and the cab 3 by brackets 10 on the side members 1 and brackets 11 on the cab 3. The axes 12 of the cylindrical bush mountings 4 are approximately vertical, but converge sufficiently (as shown) to permit the chassis frame 1, 1, 2 to twist relative to the cab by stressing in shear the rubber sleeves of the mountings 4.

Figure 5:
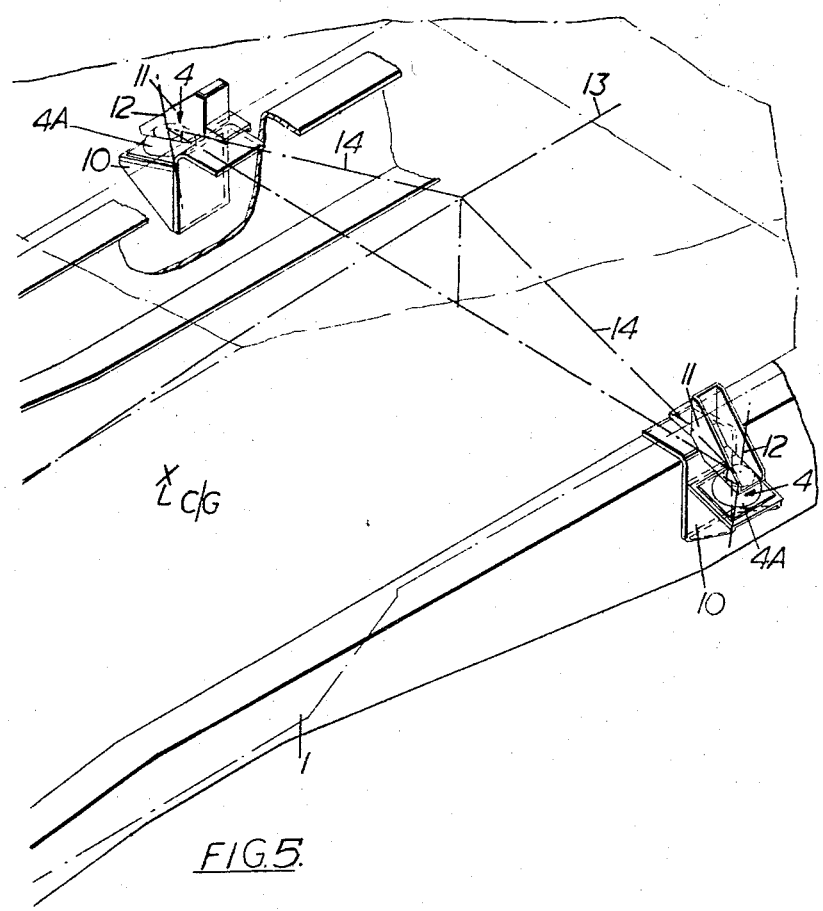
FIGURE 5 is a continuation of FIGURE 4, showing the rear cab mounting arrangement.

The line 13 in FIGURES 4, 4a and 5 is the axis of twist of the chassis, and as shown the arrangement of the mountings is such that the lines 14—14 normal to the axes 12, which are the shear axes of the mountings 4, should intersect at the twist axis 13 of the chassis.

Instead of the single central front mounting 5 shown in FIGURE 7, two side mountings 15, 15, as shown in FIGURE 4a, jointly equivalent to the mounting 5, may be used.

The rear mountings 4 are nearer to the centre of gravity C/G of the cab than the front mounting or mountings. It is important that the static load on the front mounting or mountings is not greatly affected by the load of people in the cab, otherwise, the extra load will make the front mounting or mountings operate on the steeper part of ther ate curve in FIGURE 6, and the isolation of the cab from the resonant vibration of the chassis will be lost.

I claim:
1. A vehicle comprising a cab, a chassis capable of vibration about a plurality of nodal points, first resilient support means connecting the cab to the chassis at one of said nodal points, and second resilient support means spaced from the first resilient support means and connecting the cab to the chassis, said second resilient support means having a spring rate increasing non-linearly upon increase of chassis vibrational deflection to thereby substantially isolate the cab from chassis vibration.

2. The vehicle recited in claim 1, wherein said second resilient support means includes a spring unit comprising at least one spring formed into sine-wave shape connecting the cab to the chassis.

3. The vehicle recited in claim 1, wherein said second resilient support means includes at least one spring unit comprising a casing member, a plunger member reciprocable within said casing member, one of said members being mounted on the cab and the other of said members being mounted on the chassis, and a plurality of springs formed into sine wave shape interconnecting said members.

4. The vehicle recited in claim 3, wherein said second resilient support means comprises a single said spring unit spaced forwardly of said first resilient means and centrally supporting the cab on the chassis.

5. The vehicle recited in claim 1, wherein said first resilient support means includes two rubber sleeves connecting the cab to the chassis at opposite sides thereof and nearer the cab center of gravity than the second resilient support means.

6. The vehicle recited in claim 5, wherein the rubber sleeves have their axes positioned substantially vertically, but slghitly convergent to provide stress in shear upon chassis twisting.

7. A vehicle comprising a chassis, a cab, two rear resilient mountings supporting the cab on the chassis at opposite sides thereof substantially at a node of the mode of vibration of the chassis when the vehicle is travelling, said mountings comprising rubber sleeves having their axes substantially vertical but slightly convergent, the sleeves being arranged to be stressed in shear by chassis twist, and front support means comprising a chassis cross-member and a cab cross-member, and resilient mounting means comprising a casing shell fixed to one of said cross-members, a plunger fixed to the other of said cross-members and slidably entering the casing, and multi-leaf springs in radiating formation in said casing, the springs being buckled into sine-wave shape and connecting the casing to the plunger.

References Cited by the Examiner

UNITED STATES PATENTS

| 2,882,090 | 4/1959 | Sewelin | 296—35 |
| 3,010,757 | 11/1961 | De Haan | 296—35 |

FOREIGN PATENTS

| 622,985 | 3/1927 | France. |
| 373,340 | 5/1932 | Great Britain. |
| 583,046 | 12/1946 | Great Britain. |
| 628,668 | 9/1949 | Great Britain. |

OTHER REFERENCES

DAS 1,109,539 June 1961, Germany.

BENJAMIN HERSH, *Primary Examiner.*

E. E. PORTER, J. A. PEKAR, *Assistant Examiners.*